(12) United States Patent
Iizuka et al.

(10) Patent No.: US 8,226,520 B2
(45) Date of Patent: Jul. 24, 2012

(54) AUTOMATIC TRANSMISSION

(75) Inventors: Kohei Iizuka, Wako (JP); Noriaki Saitoh, Wako (JP); Soichi Sugino, Wako (JP); Mirko Leesch, Thum (DE); Joerg Mueller, Chemnitz (DE); Rico Resch, Wilsdruff (DE)

(73) Assignee: Honda Motor Co., Ltd., Tokyo (JP)

( * ) Notice: Subject to any disclaimer, the term of this patent is extended or adjusted under 35 U.S.C. 154(b) by 264 days.

(21) Appl. No.: 12/829,396

(22) Filed: Jul. 2, 2010

(65) Prior Publication Data
US 2011/0009230 A1    Jan. 13, 2011

(30) Foreign Application Priority Data
Jul. 8, 2009 (JP) ................... 2009-161875

(51) Int. Cl.
*F16H 3/62* (2006.01)
(52) U.S. Cl. ........................................ 475/276
(58) Field of Classification Search .......... None
See application file for complete search history.

(56) References Cited

U.S. PATENT DOCUMENTS 7,722,496 B2 * 5/2010 Phillips et al. ............... 475/276
7,794,353 B2 * 9/2010 Wittkopp et al. ............. 475/276

FOREIGN PATENT DOCUMENTS

| JP | 2000-161450 | 6/2000 |
| JP | 2002-323098 | 11/2002 |
| JP | 2005-273768 | 10/2005 |

* cited by examiner

*Primary Examiner* — Dirk Wright
(74) *Attorney, Agent, or Firm* — Ditthavong Mori & Steiner, P.C.

(57) ABSTRACT

An automatic transmission includes a single-pinion first planetary gear mechanism including a first sun gear, a first ring gear, and a first carrier that each correspond to one of first to third elements in a velocity diagram. A double-pinion second planetary gear mechanism includes a second sun gear, a second ring gear, and a second carrier that each correspond to one of fourth to sixth elements in a velocity diagram. The fifth element is connected to the second element to form a first connected body that is connected to an input shaft. A single-pinion third planetary gear mechanism includes a third sun gear, a third ring gear, and a third carrier that each correspond to one of seventh to ninth elements in a velocity diagram. The eighth element is connected to an output member, and the ninth element is connected to the third element to form a second connected body.

10 Claims, 3 Drawing Sheets

FIG. 3

|  | C1 | C2 | C3 | B1 | B2 | B3 | F1 | GEAR RATIO | STEP RATIO |
|---|---|---|---|---|---|---|---|---|---|
| Rev |  | ○ | ○ | ○ |  |  |  | 2.891 | 66.7% |
| 1 | ○ | ○ |  | (○) |  |  | ○ | 4.333 | 1.667 |
| 2 | ○ |  |  | (○) | ○ |  | ○ | 2.600 | 1.600 |
| 3 | ○ |  | ○ | (○) |  |  | ○ | 1.625 | 1.375 |
| 4 | ○ |  | ○ |  | ○ |  |  | 1.182 | 1.182 |
| 5 | ○ | ○ | ○ |  |  |  |  | 1.000 | 1.231 |
| 6 | ○ |  | ○ |  |  | ○ |  | 0.812 | 1.187 |
| 7 | ○ | ○ |  |  |  |  | ○ | 0.684 | 1.105 |
| 8(1) | ○ |  |  |  | ○ | ○ |  | 0.619 | 7.000 |
| 8(2) |  | ○ | ○ |  |  | ○ |  | 0.553 | 7.834 |

AUTOMATIC TRANSMISSION

CROSS REFERENCES TO RELATED APPLICATIONS

The present application claims priority under 35 U.S.C. §119 to Japanese Patent Application No. 2009-161875, filed Jul. 8, 2009, entitled "Automatic Transmission." The contents of this application are incorporated herein by reference in their entirety.

BACKGROUND OF THE INVENTION

1. Field of the Invention

The present invention relates to an automatic transmission.

2. Description of the Related Art

There are existing automatic transmissions capable of providing eight forward gears by using a first planetary gear mechanism for input, two planetary gear mechanisms for changing speed, and six engagement mechanisms (see, for example, Japanese Unexamined Patent Application Publication No. 2005-273768).

In the automatic transmission described in Japanese Unexamined Patent Application Publication No. 2005-273768, the first planetary gear mechanism for input is a double-pinion-type planetary gear mechanism including a first sun gear, a first ring gear, and a first carrier. The first carrier rotatably and revolvably supports a pair of first pinions that mesh with each other. One of the first pinions meshes with the first sun gear, and the other of the first pinions meshes with the first ring gear.

In the first planetary gear mechanism, the first sun gear is a fixed element fixed to a transmission case, the first carrier is an input element connected to an input shaft, and the first ring gear is an output element that reduces the rotation speed of the first carrier and outputs the rotation.

Each of the two planetary gear mechanisms for changing speed is a Ravigneaux-type planetary gear mechanism including a second sun gear, a third sun gear, a second ring gear that is integrated with a third ring gear, and a second carrier. The second carrier rotatably and revolvably supports a pair of second pinions that mesh with each other. One of the second pinions meshes with the second sun gear and the second ring gear, and the other of the second pinions meshes with the third sun gear.

In a velocity diagram, this Ravigneaux-type planetary gear mechanism has first to fourth rotation elements that are arranged in this order with distances, which correspond to the gear ratios, therebetween. The first rotation element is the second sun gear, the second rotation element is the second carrier integrated with the third carrier, the third rotation element is the second ring gear integrated with the third ring gear, and the fourth rotation element is the third sun gear.

The Ravigneaux-type planetary gear mechanism includes a first engagement mechanism that releasably connects the first ring gear, which is an output element of the first planetary gear mechanism, to the fourth rotation element, which is the third sun gear; a second engagement mechanism that releasably connects the input shaft to the second rotation element, which is the second carrier; a third engagement mechanism that releasably connects the first ring gear, which is an output element, to the first rotation element, which is the second sun gear; a fourth engagement mechanism that releasably connects the first carrier, which is an input element, to the first rotation element, which is the second sun gear; a fifth engagement mechanism that releasably fixes the first rotation element, which is the second sun gear, to the transmission case; and a sixth engagement mechanism that releasably fixes the second rotation element, which is the second carrier, to the transmission case.

With such a structure, a first gear is entered by engaging the first engagement mechanism and the sixth engagement mechanism, a second gear is entered by engaging the first engagement mechanism and the fifth engagement mechanism, a third gear is entered by engaging the first engagement mechanism and the third engagement mechanism, and the fourth gear is entered by engaging the first engagement mechanism and the fourth engagement mechanism.

A fifth gear is entered by engaging the first engagement mechanism and the second engagement mechanism, a sixth gear is entered by engaging the second engagement mechanism and the fourth engagement mechanism, a seventh gear is entered by engaging the second engagement mechanism and the third engagement mechanism, and an eighth gear is entered by engaging the second engagement mechanism and the fifth engagement mechanism. The automatic transmission may have seven forward gears by omitting the first gear or the eighth gear.

SUMMARY OF THE INVENTION

According to an aspect of the invention, an automatic transmission changes rotation of an input shaft rotated by a power of a drive source to have any of a plurality of speeds and outputs the rotation through an output member. The automatic transmission includes a first planetary gear mechanism, a second planetary gear mechanism, a third planetary gear mechanism, a first engagement mechanism, a second engagement mechanism, a third engagement mechanism, a fourth engagement mechanism, a fifth engagement mechanism, and a sixth engagement mechanism. The first planetary gear mechanism includes a first single-pinion planetary gear mechanism including three elements that are a first sun gear, a first ring gear, and a first carrier that rotatably and revolvably supports a first pinion that meshes with the first sun gear and the first ring gear. The first sun gear, the first carrier, and the first ring gear each correspond to one of a first element, a second element, and a third element in a velocity diagram where the first sun gear, the first carrier, and the first ring gear are arranged in an order of distance corresponding to a gear ratio. The second planetary gear mechanism includes a double-pinion planetary gear mechanism including three elements that are a second sun gear, a second ring gear, and a second carrier that rotatably and revolvably supports a pair of second pinions that mesh with each other. One of the pair of second pinions meshes with the second sun gear and another pinion of the pair of second pinions meshes with the second ring gear. The second sun gear, the second carrier, and the second ring gear each correspond to one of a fourth element, a fifth element, and a sixth element in a velocity diagram where the second sun gear, the second carrier, and the second ring gear are arranged in an order of distance corresponding to a gear ratio. The fifth element is connected to the second element of the first planetary gear mechanism to form a first connected body that is connected to the input shaft. The third planetary gear mechanism includes a second single-pinion planetary gear mechanism including three elements that are a third sun gear, a third ring gear, and a third carrier that rotatably and revolvably supports a third pinion that meshes with the third sun gear and the third ring gear. The third sun gear, the third carrier, and the third ring gear each correspond to one of a seventh element, an eighth element, and a ninth element in a velocity diagram where the third sun gear, the third carrier, and the third ring gear are arranged in an order of distance corresponding to a gear ratio. The eighth element is connected to the output member. The ninth element is connected to the third element of the first planetary gear mechanism to form a second connected body. The first engagement mechanism releasably connects the fourth element to the seventh element. The second engagement mechanism releasably connects the sixth element to the seventh element. The third engagement mechanism releasably connects the first element to the fourth element. The fourth engagement mechanism releasably fixes the second connected body to a transmission case. The fifth engagement mechanism releasably fixes the sixth element to the transmission case. The sixth engagement mechanism releasably fixes the first element to the transmission case.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a table illustrating the states of engagement mechanisms in the embodiment for each gear.

DESCRIPTION OF THE EMBODIMENTS

Figure 1:
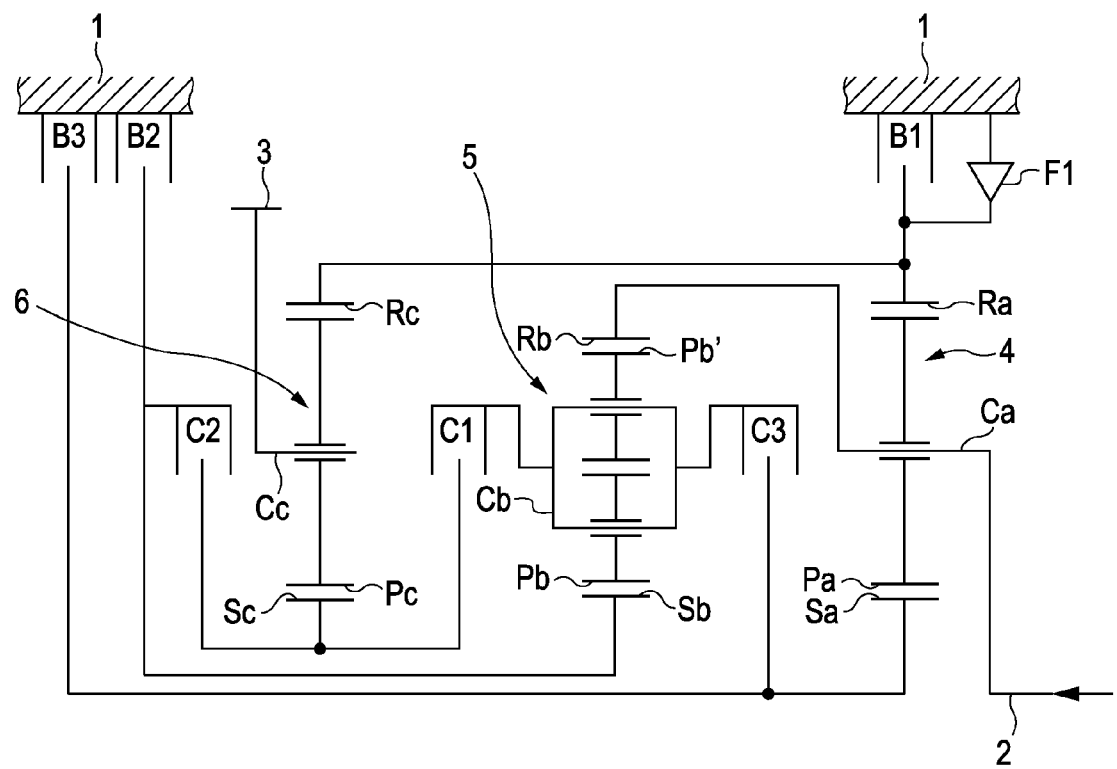
FIG. 1 is a skeleton diagram of an automatic transmission according to an embodiment of the present invention.

The embodiments will now be described with reference to the accompanying drawings, wherein like reference numerals designate corresponding or identical elements throughout the various drawings.

FIG. 1 illustrates an automatic transmission according to a first embodiment of the present invention. The automatic transmission of the first embodiment includes an input shaft 2 and an output member 3. The input shaft 2 is rotatably supported in a transmission case 1 and connected to a power source, such as an engine (not shown). The output member 3 includes an output gear that is disposed coaxially with the input shaft 2. Rotation of the output member 3 is transmitted to left and right driving wheels of a vehicle through a differential gear (not shown).

In the transmission case 1, a first planetary gear mechanism 4, a second planetary gear mechanism 5, and a third planetary gear mechanism 6 are disposed coaxially with the input shaft 2. The first planetary gear mechanism 4 is a single-pinion-type planetary gear mechanism including a sun gear Sa, a ring gear Ra, and a carrier Ca that rotatably and revolvably supports a pinion Pa. The pinion Pa meshes with the sun gear Sa and the ring gear Ra.

Figure 2:
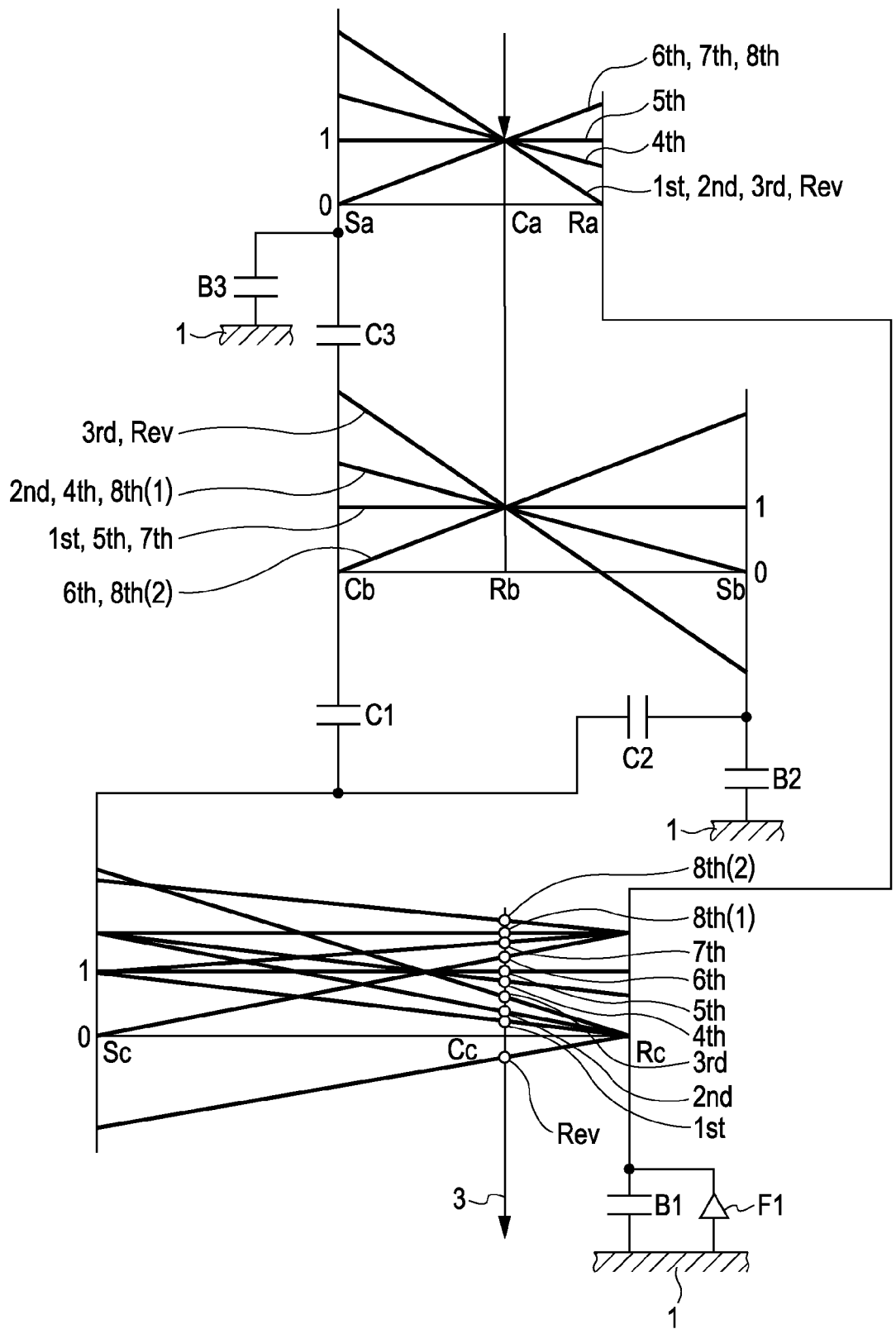
FIG. 2 is a velocity diagram of a planetary gear mechanism in the embodiment.

In the upper part of FIG. 2, a velocity diagram (a diagram illustrating the relationship between the rotation speeds of the sun gear, the carrier, and the ring gear with straight lines) of the first planetary gear mechanism 4 is illustrated. Referring to the velocity diagram, the first planetary gear mechanism 4 has first to third elements that are arranged in this order from the left side with distances, which correspond to the gear ratio, therebetween. The first element is the sun gear Sa, the second element is the carrier Ca, and the third element is the ring gear Ra.

The ratio of the distance between the sun gear Sa and the carrier Ca to the distance between the carrier Ca and the ring gear Ra is i:1, where i is the gear ratio of the first planetary gear mechanism 4 (the number of teeth of the ring gear/the number of teeth of the sun gear). In the velocity diagram, lower and upper horizontal lines respectively represent rotation speeds of "0" and "1" (the same as that of the input shaft 2).

The second planetary gear mechanism 5 is a double-pinion-type planetary gear mechanism including a sun gear Sb, a ring gear Rb, and a carrier Cb that rotatably and revolvably supports a pair of pinions Pb and Pb'. The pinions Pb and Pb' mesh with each other, and one of the pinions meshes with the sun gear Sb and the other of the pinions meshes with the ring gear Rb.

In the middle part of FIG. 2, a velocity diagram of the second planetary gear mechanism 5 is illustrated. Referring to the velocity diagram, the second planetary gear mechanism 5 has fourth to sixth elements that are arranged from the left side in this order with distances, which correspond to the gear ratio, therebetween. The fourth element is the carrier Cb, the fifth element is the ring gear Rb, and the sixth element is the sun gear Sb. The ratio of the distance between the sun gear Sb and the carrier Cb to the distance between the carrier Cb and the ring gear Rb is j:1, where j is the gear ratio of the second planetary gear mechanism 5.

The third planetary gear mechanism 6 is a single-pinion-type planetary gear mechanism including a sun gear Sc, a ring gear Rc, and a carrier Cc that rotatably and revolvably supports a pinion Pc. The pinion Pc meshes with the sun gear Sc and the ring gear Rc.

In the lower part of FIG. 2, a velocity diagram of the third planetary gear mechanism 6 is illustrated. Referring to the velocity diagram, the planetary gear mechanism has seventh to ninth elements that are arranged in this order from the left side with distances, which correspond to the gear ratio, therebetween. The seventh element is the sun gear Sc, the eighth element is the carrier Cc, and the ninth element is the ring gear Rc. The ratio of the distance between the sun gear Sc and the carrier Cc to the distance between the carrier Cc and the ring gear Rc is k:1, where k is the gear ratio of the third planetary gear mechanism 6.

The carrier Ca (second element) of the first planetary gear mechanism 4 is connected to the ring gear Rb (fifth element) of the second planetary gear mechanism 5 so that a first connected body Ca-Rb is formed. The ring gear Ra (third element) of the first planetary gear mechanism 4 is connected to the ring gear Rc (ninth element) of the third planetary gear mechanism 6 so that a second connected body Ra-Rc is formed. The first connected body Ca-Rb is connected to the input shaft 2. The carrier Cc (eighth element) of the third planetary gear mechanism 6 is connected to the output member 3, which includes the output gear.

In the automatic transmission of the embodiment, the first to third planetary gear mechanisms 4, 5, and 6 include seven rotating bodies, i.e., the sun gear Sa of the first planetary gear mechanism 4, the first connected body Ca-Rb, the second connected body Ra-Rc, the carrier Cb (fourth element) of the second planetary gear mechanism 5, the sun gear Sb (sixth element) of the second planetary gear mechanism 5, the sun gear Sc (seventh element) of the third planetary gear mechanism 6, and the carrier Cc (eighth element) of the third planetary gear mechanism 6.

The automatic transmission of the embodiment includes first to third clutches C1 to C3, which are wet-type multi-disc clutches, respectively corresponding to first to third engagement mechanisms. The first clutch C1 releasably connects the carrier Cb (fourth element) of the second planetary gear mechanism 5 to the sun gear Sc (seventh element) of the third planetary gear mechanism 6. The second clutch C2 releasably connects the sun gear Sb (sixth element) of the second planetary gear mechanism 5 to the sun gear Sc (seventh element) of the third planetary gear mechanism 6. The third clutch C3 releasably connects the sun gear Sa (first element) of the first planetary gear mechanism 4 to the carrier Cb (fourth element) of the second planetary gear mechanism 5.

The automatic transmission includes first to third brakes B1 to B3, which are wet-type multi-disc brakes, respectively corresponding to fourth to sixth engagement mechanisms. The first brake B1 releasably fixes the second connected body Ra-Rc to the transmission case 1. The second brake B2 releasably fixes the sun gear Sb (sixth element) of the second planetary gear mechanism 5 to the transmission case 1. The third brake B3 releasably fixes the sun gear Sa (first element) of the first planetary gear mechanism 4 to the transmission case 1.

In the transmission case 1, a one-way clutch F1 is disposed in parallel with the first brake B1. The one-way clutch F1 allows forward rotation (which moves a vehicle forward) and inhibits reverse rotation (which moves the vehicle backward) of the second connected body Ra-Rc.

In the automatic transmission of the embodiment, when the first clutch C1 and the second clutch C2 are engaged, the following occurs. The rotation speed of the first connected body Ca-Rb becomes "1" and the rotation speed of the second connected body Ra-Rc becomes "0" owing to the function of the one-way clutch F1. The carrier Cb (fourth element) of the second planetary gear mechanism 5, the sun gear Sb (sixth element) of the second planetary gear mechanism 5, and the sun gear Sc (seventh element) of the third planetary gear mechanism 6 rotate at the same speed. The elements of the second planetary gear mechanism 5 enter locked states in which the elements cannot rotate with respect to each other.

Therefore, the rotation speeds of all elements of the second planetary gear mechanism 5 become "1", the rotation speed of the sun gear Sc (seventh element) of the third planetary gear mechanism 6 becomes "1", and the velocity line of the third planetary gear mechanism 6 becomes "1st" illustrated in FIG. 2. Thus, the first gear is entered.

At this time, although the first brake B1 is disengaged, the first brake B1 does not cause friction loss because the rotation speed of the ring gear Rc (ninth element) of the third planetary gear mechanism 6 is "0" owing to the function of the one-way clutch F1.

When the first brake B1 is engaged in addition to the first clutch C1 and the second clutch C2, the first gear is entered in a state in which engine braking is available.

When the first clutch C1 and the second brake B2 are engaged, the following occurs. The rotation speed of the first connected body Ca-Rb becomes "1", the rotation speed of the sun gear Sb (sixth element) of the second planetary gear mechanism 5 become "0", and the rotation speed of the second connected body Ra-Rc becomes "0" owing to the function of the one-way clutch F1. The carrier Cb (fourth element) of the second planetary gear mechanism 5 and the sun gear Sc (seventh element) of the third planetary gear mechanism 6 rotate at the same speed. The velocity lines of the second planetary gear mechanism 5 and the third planetary gear mechanism 6 become "2nd" illustrated in FIG. 2. Thus, the second gear is entered.

At this time, as in the case of the first gear, the first brake B1 does not cause friction loss. When the first brake B1 is engaged in addition to the first clutch C1 and the second brake B2, the second gear is entered in a state in which engine braking is available.

When the first clutch C1 and the third clutch C3 are engaged, the following occurs. The rotation speed of the first connected body Ca-Rb becomes "1" and the rotation speed of the second connected body Ra-Rc becomes "0" owing to the function of the one-way clutch F1. The sun gear Sa (first element) of the first planetary gear mechanism 4, the carrier Cb (fourth element) of the second planetary gear mechanism 5, and the sun gear Sc (seventh element) of the third planetary gear mechanism 6 rotate at the same speed.

The velocity lines of the first planetary gear mechanism 4 and the third planetary gear mechanism 6 become "3rd" illustrated in FIG. 2. Thus, the third gear is entered. At this time, as in the cases of the first and second gears, the first brake B1 does not cause friction loss. When the first brake B1 is engaged in addition to the first clutch C1 and the third clutch C3, the third gear is entered in a state in which engine braking is available.

As described above, because the automatic transmission of the embodiment includes the one-way clutch F1, when shifting from the first gear to the fourth gear, it is not necessary to supply hydraulic pressure or stop supplying hydraulic pressure to the first brake B1 unless engine braking is used, so that controllability of shifting from the first gear to the fourth gear is improved.

When the first clutch C1, the third clutch C3, and the second brake B2 are engaged, the following occurs. The rotation speed of the first connected body Ca-Rb becomes "1" and the rotation speed of the sun gear Sb (sixth element) of the second planetary gear mechanism 5 becomes "0". The sun gear Sa (first element) of the first planetary gear mechanism 4, the carrier Cb (fourth element) of the second planetary gear mechanism 5, and the sun gear Sc (seventh element) of the third planetary gear mechanism 6 rotate at the same speed.

The velocity lines of the first to third planetary gear mechanisms 4 to 6 become "4th" illustrated in FIG. 2. Thus, the fourth gear is entered.

When the first clutch C1, the second clutch C2, and the third clutch C3 are engaged, the following occurs. The rotation speed of the first connected body Ca-Rb becomes "1". The sun gear Sa (first element) of the first planetary gear mechanism 4, the carrier Cb (fourth element) of the second planetary gear mechanism 5, the sun gear Sb (sixth element) of the second planetary gear mechanism 5, and the sun gear Sc (seventh element) of the third planetary gear mechanism 6 rotate at the same speed. All elements of the first to third planetary gear mechanisms 4, 5, and 6 enter locked states in which the elements cannot rotate with respect to each other. The velocity lines of the first to third planetary gear mechanisms 4, 5, and 6 become "5th" illustrated in FIG. 2. The rotation speed of the carrier Cc (eighth element) of the third planetary gear mechanism 6 becomes "1", which is the same as that of the input shaft 2. Thus, the fifth gear is entered.

When the first clutch C1, the third clutch C3, and the third brake B3 are engaged, the following occurs. The rotation speed of the first connected body Ca-Rb becomes "1". The sun gear Sa (first element) of the first planetary gear mechanism 4, the carrier Cb (fourth element) of the second planetary gear mechanism 5, and the sun gear Sc (seventh element) of the third planetary gear mechanism 6 are connected to one another, and the rotation speeds of these elements become "0". The velocity lines of the first planetary gear mechanism 4 and the third planetary gear mechanism 6 become "6th" illustrated in FIG. 2. Thus, the sixth gear is entered.

When the first clutch C1, the second clutch C2, and the third brake B3 are engaged, the following occurs. The rotation speed of the first connected body Ca-Rb becomes "1", and the sun gear Sa (first element) of the first planetary gear mechanism 4 becomes "0". The elements of the second planetary gear mechanism 5 enter locked states in which the elements cannot rotate with respect to each other. The rotation speed of the sun gear Sc (seventh element) of the third planetary gear mechanism 6 becomes "1".

The velocity lines of the first to third planetary gear mechanisms 4 to 6 become "7th" illustrated in FIG. 2. Thus, the seventh gear is entered.

When the first clutch C1, the second brake B2, and the third brake B3 are engaged, the following occurs. The rotation speed of the first connected body Ca-Rb becomes "1", and the rotation speeds of the sun gear Sa (first element) of the first planetary gear mechanism 4 and the sun gear Sb (sixth element) of the second planetary gear mechanism 5 become "0". The velocity lines of the first to third planetary gear mechanisms 4 to 6 become "8th(1)" illustrated in FIG. 2. Thus, the first eighth gear is entered.

The eighth gear may be entered by engaging the second clutch C2, the third clutch C3, and the third brake B3. This eighth gear will be refereed to as the second eighth gear. In this case, the rotation speed of the first connected body Ca-Rb becomes "1", and the rotation speeds of the sun gear Sa (first element) of the first planetary gear mechanism 4 and the carrier Cb (fourth element) of the second planetary gear mechanism 5 become "0". The velocity lines of the first to third planetary gear mechanisms 4, 5, and 6 become "8th(2)" illustrated in FIG. 2. The second eighth gear may be used as the ninth gear.

When the second clutch C2, the third clutch C3, and the first brake B1 are engaged, the following occurs. The rotation speed of the first connected body Ca-Rb becomes "1", and the rotation speed of the second connected body Ra-Rc becomes "0". The sun gear Sa (first element) of the first planetary gear mechanism 4 and the carrier Cb (fourth element) of the second planetary gear mechanism 5 rotate at the same speed. The sun gear Sb (sixth element) of the second planetary gear mechanism 5 and the sun gear Sc (seventh element) of the third planetary gear mechanism 6 rotate at the same speed. The velocity lines of the first to third planetary gear mechanisms 4 to 6 become "Rev" illustrated in FIG. 2. Thus, the reverse gear is entered.

FIG. 3 is a table illustrating the relationship between the gears described above and the states of the engagement mechanisms, which are the clutches C1 to C3 and the brakes B1 to B3. An open circle represents an engaged state. FIG. 3 also illustrates the gear ratio (the rotation speed of the input shaft 2/the rotation speed of the output member 3) for each gear, when the gear ratio i of the first planetary gear mechanism 4 is 1.666, the gear ratio j of the second planetary gear mechanism 5 is 2.500, and the gear ratio k of the third planetary gear mechanism 6 is 3.333. In this case, the step ratios (the ratios between adjacent gear ratios) are appropriate and the ratio ranges (gear ratio of the first gear/gear ratios of the eighth gears), which are illustrated in the cells for the eighth gears, are also appropriate.

The automatic transmission of the embodiment is capable of providing eight forward gears. In each gear, three of the first to six engagement mechanisms, which are the clutches C1 to C3 and the brakes B1 to B3, engage. Therefore, in each gear, three engagement mechanisms are disengaged. As compared with existing transmissions, in which four engagement mechanisms are disengaged, friction loss due to disengaged engagement mechanisms is reduced, so that the efficiency of transmission is improved. For the first to third gears, the first brake B1 is not taken into account because the first brake B1 does not cause friction loss even when the first brake B1 is disengaged.

It has been described that the automatic transmission of the embodiment has eight forward gears. However, one of the gears may be omitted, and the automatic transmission may have seven forward gears. For example, when the eighth gear is omitted, the transmission has seven forward gears.

The automatic transmission of the embodiment includes a one-way clutch F1. However, the one-way clutch F1 may be omitted. In this case, the first brake B1 is to be engaged when the first to third gears are to be entered.

In the embodiment, the fourth engagement mechanism is the first brake B1, which is a wet-type multi-disc brake. However, the fourth engagement mechanism may be a two-way clutch F2 that can be switched between two states, one state allowing forward rotation and inhibiting reverse rotation of the ring gear Rc (ninth element) of the third planetary gear mechanism 6, the other state inhibiting forward rotation and allowing reverse rotation of the ring gear Rc (ninth element).

In this case, for forward gears, the two-way clutch F2 is to be switched to the state allowing forward rotation and inhibiting reverse rotation of the ring gear Rc (ninth element) of the third planetary gear mechanism 6. For reverse gears, the two-way clutch F2 is to be switched to the state inhibiting forward rotation and allowing reverse rotation of the ring gear Rc (ninth element).

Also with this structure, as with the structure having the one-way clutch F1, controllability of shifting from the first gear to the fourth gear is improved. Moreover, the first brake B1 for the reverse gear, which has a comparatively high capacity, can be omitted, so that friction loss can be further reduced and the efficiency of transmission can be improved.

The fourth engagement mechanism may be a meshing mechanism such as a dog clutch mechanism. The meshing mechanism may include a rotation synchronizing mechanism such as a synchromesh mechanism. In contrast to a wet-type multi-disc brake, a meshing mechanism does not cause friction loss when disengaged, so that friction loss can be further reduced and the efficiency of transmission can be improved. Moreover, the number of hydraulic engagement mechanisms can be reduced, so that the load to a hydraulic pump (not shown) can be reduced.

The first engagement mechanism may be a meshing mechanism such as a dog clutch. The meshing mechanism may be a rotation synchronization mechanism such as synchromesh mechanism. The meshing mechanism may be hydraulic or electric. For example, when an electric meshing mechanism is used as the first engagement mechanism, friction loss caused in the second eighth gear, in which the first engagement mechanism is disengaged, can be reduced further, and the number of hydraulic engagement mechanisms can be further reduced, so that the load to the hydraulic pump (not shown) can be reduced.

As described in the description of the embodiments, the automatic transmission enables seven or more forward gears, and three of the first to sixth engagement mechanisms engage in each gear. Therefore, three engagement mechanisms are disengaged in each gear. As compared with existing automatic transmissions in which four engagement mechanisms are disengaged, friction loss caused by disengaged engagement mechanisms can be reduced so that the efficiency of transmission is improved.

It is preferable that the fourth engagement mechanism of the transmission mechanism be a meshing mechanism. With this structure, the fourth engagement mechanism, which is engaged only for low forward gears and disengaged only for high gears as will be described below in the description of the preferred embodiments, is a meshing mechanism that does not cause friction loss. Therefore, friction loss of high forward gears can be further suppressed, so that the efficiency of transmission can be further improved.

It is preferable that the automatic transmission include a one-way clutch that allows forward rotation (which moves a vehicle forward) and inhibits reverse rotation (which moves a vehicle backward) of the second connected body. With this structure, the first to third gears can be entered without engaging the fourth engagement element. As compared with the case in which the transmission mechanism does not include a one-way clutch, controllability of shifting between the third gear and the fourth gear can be improved.

It is preferable that the fourth engagement mechanism of the automatic transmission be a two-way clutch that can be switched between a first state and a second state, the first state allowing forward rotation and inhibiting reverse rotation of the second connected body, the second state inhibiting forward rotation and allowing reverse rotation of the second connected body. Also with this structure, controllability of shifting between the third gear and the fourth gear can be improved. Moreover, a wet-type multi-disc brake for the reverse gear, which has a comparatively high capacity, can be omitted, so that friction loss can be further reduced and the efficiency of transmission can be further improved. Furthermore, the number of hydraulic engagement mechanisms can be reduced, so that the load to a hydraulic pump can be reduced.

The first engagement mechanism of the automatic transmission may be a meshing mechanism. Also with this structure, the number of hydraulic engagement mechanisms can be reduced, so that the load to a hydraulic pump can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. An automatic transmission that changes rotation of an input shaft rotated by a power of a drive source to have any of a plurality of speeds and outputs the rotation through an output member, the automatic transmission comprising:
    a first planetary gear mechanism comprising a first single-pinion planetary gear mechanism including three elements that are a first sun gear, a first ring gear, and a first carrier that rotatably and revolvably supports a first pinion that meshes with the first sun gear and the first ring gear, the first sun gear, the first carrier, and the first ring gear each corresponding to one of a first element, a second element, and a third element in a velocity diagram where the first sun gear, the first carrier, and the first ring gear are arranged in an order of distance corresponding to a gear ratio;
    a second planetary gear mechanism comprising a double-pinion planetary gear mechanism including three elements that are a second sun gear, a second ring gear, and a second carrier that rotatably and revolvably supports a pair of second pinions that mesh with each other, one of the pair of second pinions meshing with the second sun gear and another pinion of the pair of second pinions meshing with the second ring gear, the second sun gear, the second carrier, and the second ring gear each corresponding to one of a fourth element, a fifth element, and a sixth element in a velocity diagram where the second sun gear, the second carrier, and the second ring gear are arranged in an order of distance corresponding to a gear ratio, the fifth element being connected to the second element of the first planetary gear mechanism to form a first connected body that is connected to the input shaft;
    a third planetary gear mechanism comprising a second single-pinion planetary gear mechanism including three elements that are a third sun gear, a third ring gear, and a third carrier that rotatably and revolvably supports a third pinion that meshes with the third sun gear and the third ring gear, the third sun gear, the third carrier, and the third ring gear each corresponding to one of a seventh element, an eighth element, and a ninth element in a velocity diagram where the third sun gear, the third carrier, and the third ring gear are arranged in an order of distance corresponding to a gear ratio, the eighth element being connected to the output member, the ninth element being connected to the third element of the first planetary gear mechanism to form a second connected body;
    a first engagement mechanism that releasably connects the fourth element to the seventh element;
    a second engagement mechanism that releasably connects the sixth element to the seventh element;
    a third engagement mechanism that releasably connects the first element to the fourth element;
    a fourth engagement mechanism that releasably fixes the second connected body to a transmission case;
    a fifth engagement mechanism that releasably fixes the sixth element to the transmission case; and
    a sixth engagement mechanism that releasably fixes the first element to the transmission case.

2. The automatic transmission according to claim 1, wherein the fourth engagement mechanism comprises a meshing mechanism.

3. The automatic transmission according to claim 1, further comprising:
    a one-way clutch configured to allow forward rotation of the second connected body and inhibit reverse rotation of the second connected body.

4. The automatic transmission according to claim 1, wherein the fourth engagement mechanism comprises a two-way clutch switchable between a first state in which forward rotation of the second connected body is allowed and reverse rotation of the second connected body is inhibited and a second state in which forward rotation of the second connected body is inhibited and reverse rotation of the second connected body is allowed.

5. The automatic transmission according to claim 1, wherein the first engagement mechanism comprises a meshing mechanism.

6. The automatic transmission according to claim 2, further comprising:
    a one-way clutch configured to allow forward rotation of the second connected body and inhibit reverse rotation of the second connected body.

7. The automatic transmission according to claim 2, wherein the first engagement mechanism comprises a meshing mechanism.

8. The automatic transmission according to claim 3, wherein the first engagement mechanism comprises a meshing mechanism.

9. The automatic transmission according to claim 4, wherein the first engagement mechanism comprises a meshing mechanism.

10. The automatic transmission according to claim 6, wherein the first engagement mechanism comprises a meshing mechanism.

* * * * *